(12) United States Patent
Bellotti et al.

(10) Patent No.: US 7,941,486 B2
(45) Date of Patent: May 10, 2011

(54) SYSTEMS AND METHODS FOR INTEGRATING ELECTRONIC MAIL AND DISTRIBUTED NETWORKS INTO A WORKFLOW SYSTEM

(75) Inventors: Victoria M. E. Bellotti, San Francisco, CA (US); Ian E. Smith, San Francisco, CA (US)

(73) Assignee: Xerox Corporation, Norwalk, CT (US)

( * ) Notice: Subject to any disclaimer, the term of this patent is extended or adjusted under 35 U.S.C. 154(b) by 2514 days.

(21) Appl. No.: 09/683,532

(22) Filed: Jan. 16, 2002

(65) Prior Publication Data
US 2003/0135554 A1 Jul. 17, 2003

(51) Int. Cl.
G06F 15/16 (2006.01)
G06F 7/00 (2006.01)
G06F 17/00 (2006.01)
G06Q 10/00 (2006.01)

(52) U.S. Cl. ......................... 709/206; 705/301; 707/608

(58) Field of Classification Search .................. 705/5, 8, 705/64; 709/205, 206
See application file for complete search history.

(56) References Cited

U.S. PATENT DOCUMENTS

| 6,594,636 B1 * | 7/2003 | Sakaguchi et al. | 705/7 |
| 2002/0133495 A1 * | 9/2002 | Rienhoff et al. | 707/100 |
| 2002/0169835 A1 * | 11/2002 | Paul et al. | 709/206 |

OTHER PUBLICATIONS

Kim, HyoungJun et al. "Implementation of a Workflow-based Web Application with an Electronic Signature Mechanism," Oct. 22, 1998, ICCT, pp. 1-5.*

* cited by examiner

*Primary Examiner* — Krista M Zele
*Assistant Examiner* — Azizul Choudhury
(74) *Attorney, Agent, or Firm* — Oliff & Berridge, PLC

(57) ABSTRACT

Electronic messages with system-generated network addresses are transmitted to recipients to enable access to specific locations in the workflow system. The network addresses may be used only once, are generated using secure identifications and/or can be generated randomly. These secure identifications can be created by encoding a large number into the network address. The recipient of this network address may be required to himself to the workflow system, for example, as a means for minimizing security risks to the workflow system. The network addresses generated to specific locations within a workflow system are intended for specific recipients but may be shared by the recipients as circumstances require. Electronic mail can be transmitted with specific electronic mail addresses encoded in the electronic mail message. The specific email address can be encoded into a "Reply-to" function. Alternatively, specific email addresses can be embedded into the message portion of the email message.

15 Claims, 11 Drawing Sheets

SYSTEMS AND METHODS FOR INTEGRATING ELECTRONIC MAIL AND DISTRIBUTED NETWORKS INTO A WORKFLOW SYSTEM

BACKGROUND OF THE INVENTION

1. Field of Invention

This invention relates to systems and methods for integrating electronic mail and network resources into a workflow system.

2. Description of Related Art

Workflow systems are a key technology for supporting, executing, controlling, and documenting business processes. Workflow systems automate processes and allow documents, information, and/or tasks to be tracked and/or transferred between and/or among users and/or systems efficiently and effectively.

Workflow systems work, in part, by interpreting the definitions of the process and invoking the appropriate resources necessary for the various steps of the process. Workflow systems also control interactions between and/or among the users and/or other applications. Additionally, workflow systems usually provide supervisory or administrative functions, allow tasks to be reassigned, increased, or audited, and manage information for a process or for one of a number specific process instances. Workflow systems are often used in business areas such as insurance, banking, legal, and general administration. Workflow systems can also be helpful in some industrial and manufacturing operations.

An important element of workflow systems is document management. Businesses have increasing needs to transmit documents or portions of documents between and/or among individuals and/or organizations. Often, these documents must be sequenced and/or completed within a set period of time. With key personnel often spread over wide geographical areas and with the demand for timely execution, using workflow systems to manage and control documentation keeps the business process efficient and helps organizations remain competitive.

SUMMARY OF THE INVENTION

As companies spread out over many distributed locations, the coordination of tasks becomes more necessary. Transmitting and receiving process-required documentation becomes even more critical when key personnel are in multiple locations. Further, workflow systems often must interact with personnel who do not have access to the system but are critical to the work process. Using currently available communication systems and networks, such as the Internet, can facilitate the workflow process and management of process-critical documentation. New mechanisms are needed, however, that can use network functions to enhance the workflow process.

This invention provides systems and methods that use electronic mail and networks to advance the state of workflow systems.

This invention separately provides systems and methods that generate network addresses associated with specific locations in a workflow system.

This invention separately provides systems and methods that encode electronic mail addresses into an electronic message.

In various exemplary embodiments of the systems and methods according to this invention, electronic messages with system-generated network addresses are transmitted to recipients that enable access to specific locations in the workflow system. In various exemplary embodiments of the systems and methods according to this invention, the network addresses are generated randomly, are used only once, and/or are generated using secure identifications. In various exemplary embodiments of the systems and methods according to this invention, these secure identifications are created by encoding a large number into the network address.

In various exemplary embodiments of the systems and methods according to this invention, the recipient of the network addresses that provide access to a specific location within the workflow system may be required to provide an email address to the workflow system as a means of identification. This may be used, for example, as a means for minimizing security risks to the workflow system. In various exemplary embodiments of the systems and methods according to this invention, the network addresses generated to specific locations within a workflow system are intended for specific recipients but may be shared by the recipients as circumstances require. Accordingly, any secondary recipient of the specific network address, upon accessing the specific network address, may have to provide the email address of the original recipient of the specific network address.

In various exemplary embodiments of the systems and methods according to this invention, electronic mail is transmitted with specific electronic mail addresses encoded in the electronic mail message. In various exemplary embodiments, the specific email address is encoded into a "Reply-to" function. In this case, when the recipient replies to this email message, the workflow system receives and acts on the reply, as well as optionally forwards the reply to the sender of the original email message.

In various other exemplary embodiments, specific email addresses are used to provide specific types of responses. In this case, the specific email addresses can be embedded into the message portion of the email message. When the recipient replies by selecting one of the specific email addresses, the reply is forwarded to the workflow control system based on the selected specific email address. The workflow system acts on the reply appropriately, and optionally forwards the reply to the sender of the original email message.

According to various embodiments of the systems and methods according to this invention, different system-generated network addresses may be specific to individual recipients but linked to a common location within the workflow system. In various exemplary embodiments, the system-generated network addresses may be uniquely specific to each individual recipient. By knowing which recipient received which system-generated network address, the workflow system can identify each recipient who accesses the workflow system by the specific network address each recipient uses to access the workflow system. For example, documentation requiring the approval of a person who does not have access to the workflow system may be sent via an electronic mail message with a network address generated by the system and inserted into the body of the message. By activating the network address in the body of the message, the recipient is able to access the specific location within the workflow system that stores the appropriate documentation requiring approval.

According to various embodiments of the systems and methods of this invention, the workflow system can receive, for example, by interception, electronic messages from the user or users of the workflow system and can initiate specific sequences and processes within the workflow system. For example, in one case, a workflow user sends a document via the workflow system to a recipient, who is outside the workflow system, for approval. The workflow system intercepts the electronic message and begins a process on the document, such as identifying whom the document is being sent to, the date the approval/disapproval is expected, and/or any other relevant information. The workflow system can then track the document automatically and send reminders to both the recipient and the sender at predetermined intervals.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the invention will be described in detail with reference to the following figures, wherein.

DETAILED DESCRIPTION OF EXEMPLARY EMBODIMENTS

The systems and methods of this invention enable the state of a workflow process to be advanced using distributed networks and electronic messaging. The mechanisms and techniques of the electronic messaging and distributed networks, used in conjunction with a workflow system may be of any combination of known or later-developed hardware devices and/or software programs designed to provide a level of compatible communication and exchange of data/information.

In various exemplary embodiments of the systems and methods of this invention, a user operating within a workflow system effectively communicates with a recipient located outside the workflow system. A distributed network to which the user is connected is used to communicate with the outside recipient. The user, alternatively, can be connected to the workflow system, which in turn is connected to the distributed network, enabling the user to communicate with the recipient via the workflow system.

In various exemplary embodiments, mutually compatible electronic messaging techniques and mechanisms may be used to establish communication between the user and the recipient or the workflow system and the recipient. The electronic messaging techniques and mechanisms used may be predicated on the type of distributed network being used.

In various exemplary embodiments, the compatibility of the workflow system with the distributed network enables access from the network to the workflow system and vice versa. This compatibility enables elements of the workflow system to use specific network addresses. For example, a workflow system connected to the World Wide Web portion of the Internet may use the address protocol supported by the World Wide Web known as uniform resource locators (URLs). As a result, specific elements within the workflow system may have specific URL addresses that enable Internet access to the workflow system. It should be appreciated that the term "network address" encompasses a variety of different addressing schemes or protocols, such as a uniform resource locator (URL), an email address, or any other known or later-developed addressing protocol or scheme for identifying a particular location on a network.

It should be appreciated that the types of user and recipient systems, workflow systems, and distributed networks transmitting and receiving electronic communications may vary or differ depending on the types of systems and/or devices used. The systems and methods of this invention do not depend on any specific workflow system and/or network. Accordingly, the systems and methods are usable with any appropriate workflow system and/or network.

Figure 1:
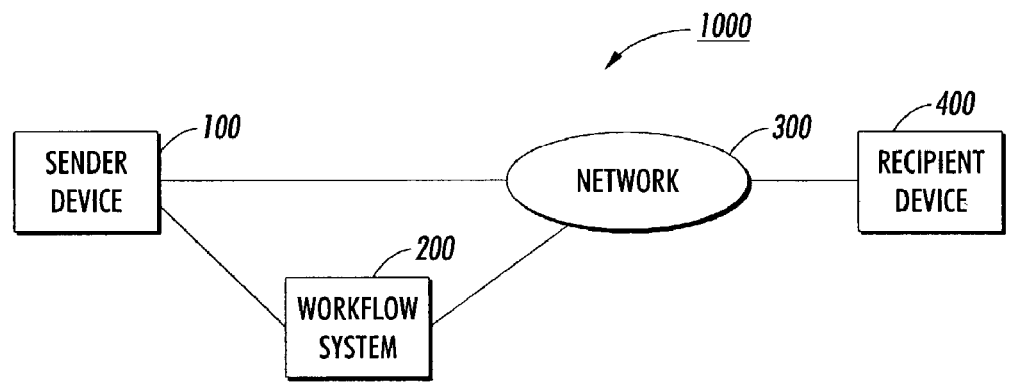
FIG. 1 is a block diagram of one exemplary embodiment of a workflow system and network usable with the systems and methods of this invention.

FIG. 1 is a block diagram of one exemplary embodiment of a data communication system 1000 usable to connect a user of a workflow system 200 with a recipient outside the workflow system 200. As shown in FIG. 1, the data communication system 1000 includes one or more sender devices 100 connected to a network 300. A recipient device 400 is also connected to the network 300. The sender device 100 is also connected to the workflow system 200, which in turn is also connected to the network 300.

It should be appreciated that the elements 100-400 shown in FIG. 1, while depicted separately, are not necessarily separate and distinct components. Thus, the functions and/or operations of each of these elements may be carried out by one or more of devices, structures, and/or systems. Further, it should be appreciated that the devices 100 and 400 in FIG. 1 may each be any device that uses a data network to achieve connectivity with another device. Additionally, it should be appreciated that the devices 100 and 400 may also be the same device.

As shown in FIG. 1, the sender devices 100 and the recipient devices 400 can each be any device that is connectable to a data communication network. Each of the sender device 100 and recipient device 400 may be implemented using a programmed general purpose computer, a special purpose computer, a programmed microprocessor, a digital signal processor (DSP), an ASIC or other integrated circuit device or programmable logic device such as a PLD, PLA, FPGEA or PAL, or the like. In general, any hardware and/or software system capable of implementing and processing data and information from a data network may be used to implement the sender and/or recipient devices 100 and 400.

In various exemplary embodiments, the network 300 includes, but is not limited to, for example, public switched telephone networks, local area networks, wide area networks, intranets, extranets, the Internet, or any other type of distributed network, each of which can include wired and/or wireless portions.

In various exemplary embodiments, the workflow system 200 includes, but is not limited to, any known or later-developed software system that defines, executes, controls, and/or documents business processes. The software system may contain the logic of the workflow, interpret the definition of the processes, and invoke the necessary resources and/or applications required at various steps of the process. This may be accomplished by storing and interpreting information and creating and managing instances of the process as needed. Further, the workflow system 200 may control the interactions between users and the interaction of users with other applications. Also, the workflow system 200 may provide supervisory or administrative functions that allow work to be reassigned and/or increased or decreased and/or information to be audited and/or managed for the system or one of the specific process instances. It should be appreciated that the type of workflow system 200 that is implemented can depend upon the requirements of the business process being managed and the level of requirements to be controlled.

In various exemplary embodiments of the systems and methods according to this invention, a user of a workflow system sends a message to a recipient. The message is diverted to the workflow system, which adds one or more network and/or email addresses to be used by the recipient when replying to the message from the user. The recipient responds to the message using one of these addresses, thus "thinking" that the reply message has been sent directly to the sender. For example, the reply could be an approval of a document attached to or accessed via the email message. Because the workflow system has introduced the one or more network and/or email addresses at transmission, the message actually arrives at the workflow system, perhaps unbeknownst to the replying person. The workflow system takes the appropriate action, such as, for example, marking the document referenced in the email message as approved. The workflow system then sends the reply message from the recipient on to the sender. It should thus be appreciated that, in such exemplary embodiments according to this invention, this interaction allows the user and the recipient to simply exchange email, while the state of the workflow system gets updated as part of the exchange.

Figure 2:
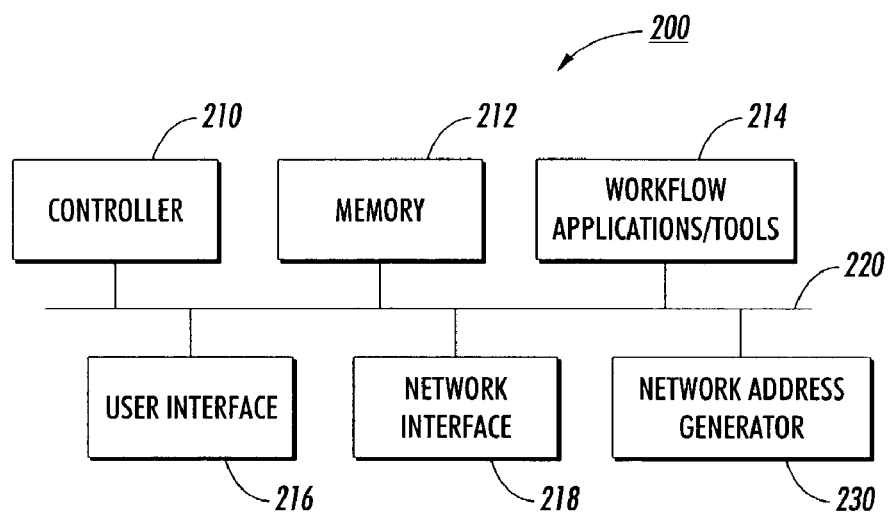
FIG. 2 is a block diagram of one exemplary embodiment of the workflow system of FIG. 1.

FIG. 2 is a block diagram of one exemplary embodiment of the workflow system 200. As shown in FIG. 2, the workflow system 200 includes one or more of a controller 210, a memory 212, one or more workflow applications and/or tools 214, a user interface 216, and a network interface 218. All of these elements 210-218 may be connected together by a common bus 220. In various exemplary embodiments, the workflow system 200 includes a network address generator 230.

In various exemplary embodiments, the network address generator 230 generates a network address and associates that network address with a workflow document, task, event, and/or the like. The network address generator 230 should be able to receive an indication in an email message from the user regarding what kind of network address to insert, and where in the email message the network address should be inserted. The network address generator 230 should be able to use that information to determine what network addresses to insert and where in the email message to insert the network addresses, depending upon the process initiated by the indication contained in the email message sent by the user.

In various other exemplary embodiments, the network address generator 230 can include a software program that develops an arbitrarily-derived set of numbers, symbols, and/or any combination of alphanumeric characters. For example, in various embodiments of the systems and methods of this invention, the network address generator 230 may randomly generate a network address that is compatible with and supported by the network 300.

Further, this network address may identify a specific location within the workflow system 200. For example, a workflow system 200 connected to the Internet could randomly create an Internet address, such as, for example, a URL, that is in the proper format and sequence to be compatible with the Internet. In various other exemplary embodiments, the network address "generated" by the network address generator 230 can be "generated" by the network address generator 230 by selecting the network address from a predefined list of such network addresses. In this case, the network address generator 230 must use one of the addresses of the predefined list that is not currently assigned to some other workflow document, task, event or the like.

Similarly, after the network address generator 230 selects one of the predefined addresses, that address cannot be used by the network address generator 230 for some other purpose until the selected network address is released, for example, by the recipient responding to the email in an appropriate manner. In this case, the network address is not random, but is rendered specific to this electronic message for the duration until this electronic message is properly responded to.

The memory 212 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk, and disk drive, a writeable or re-writeable optical disk and disk drive, a hard drive, flash memory or the like. Likewise, the non-alterable or fixed memory can be implemented using any one or more of ROM, PROM, EPROM, EEPROM, an optical disk, ROM disk such as a CD-ROM or DVD-ROM disk and disk drive or the like.

The one or more workflow applications and/or tools 214 can include any software programs or suites of programs designed to support the workflow process. This may include, but is not limited to, software programs that handle any one or more of project development, logic, process control, and/or work list manipulation, and/or the like. It should be appreciated that the workflow system capabilities and applications may differ depending upon the requirements the business process being managed using the workflow system 200.

The user interface 216 allows the workflow system 200 to connect to the users of the workflow system 200, such as, for example, one or more of the sender devices 100.

The network interface 218 provides connectivity to the network 300. For example, in various exemplary embodiments, all electronic communications to and/or from the users of the one or more sender devices 100 supported by the network 300 could pass through the network interface 218.

It should be appreciated that the communication techniques and protocols used by the workflow system 200 may be predicated on the type of distributed network 300 that the workflow system 200 interfaces with. For example, the HTTP protocol may be used for communications over the Internet. Other protocols supported by the Internet may be used as well. Further, techniques and applications supported by the one or more sender devices 100 that allow for electronic communication between the one or more sender devices 100 and the recipient devices 400 may be used.

It should be appreciated that the type of electronic messaging application used by the workflow system 200 and/or the one or more sender devices 100 may be predicated upon the type of distributed system 300 to which the workflow system 200 and/or the one or more sender devices 100 are connected. For example, electronic messaging sent through the Internet is sent using the simple mail transfer protocol (SMTP) that may be supported by the sender devices 100, the workflow system 200, and/or the recipient device 400. According to various embodiments of the systems and methods of this invention, the use of electronic messaging with attachments would be supported by these components as well. For example, if transmitting over the Internet, attachments to electronic messages could use the multipurpose Internet mail extensions (MIME) standard.

Figure 3:
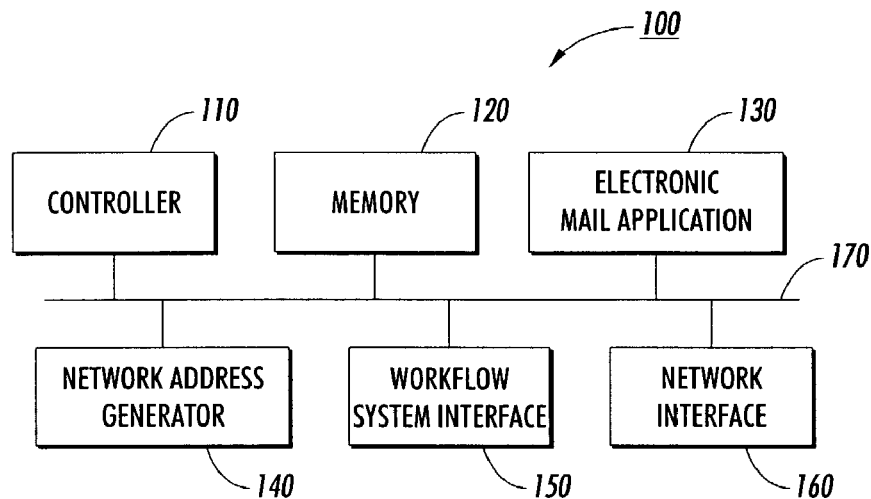
FIG. 3 is a block diagram of a first exemplary embodiment of the sender device of FIG. 1 according to this invention.

FIG. 3 is a block diagram of one exemplary embodiment of the sender device 100. As shown in FIG. 3, the sender device 100 includes one or more of a controller 110, a memory 120, an electronic mail application 130, a network address generator 140, a workflow system interface 150, and a network interface 160. All of these elements 100-160 may be connected together by a common bus 170. It should be appreciated that, if the workflow system 200 includes the network address generator 230, the network address generator 140 could be omitted, and vice-versa.

As shown in FIG. 3, the memory 120 can be implemented using any appropriate combination of alterable, volatile or non-volatile memory or non-alterable, or fixed, memory. The alterable memory, whether volatile or non-volatile, can be implemented by any one or more of static or dynamic RAM, a floppy disk and disk drive, a writeable or re-writeable optical disk and disk drive, a hard drive, flash memory or the like. Likewise, the non-alterable or fixed memory can be implemented using the any one or more of ROM, PROM, EPROM, EEPROM, an optical disk, ROM disk, such as CD-ROM or DVD-ROM, and disk drive or the like.

The electronic mail application 130 can be any software program that generates electronic mail messaging that is compatible with the network 300 that the sender devices 100 is connected to and over which communication will be sent to the recipient devices 400.

In various exemplary embodiments, the network address generator 140 generates a network address and associates that network address with a workflow document, task, event, and/or the like. In various other exemplary embodiments, the network address generator 140 can include a software program that develops an arbitrarily-derived set of numbers, symbols, and/or any combination of alphanumeric characters. For example, in various embodiments of the systems and methods of this invention, the network address generator 140 may randomly generate a network address that is compatible with and supported by the network 300.

Further, this network address may identify a specific location within the workflow system 200. For example, a workflow system 200 connected to the Internet could randomly create an Internet address, i.e., a URL, that is in the proper format and sequence to be compatible with the Internet. In various other exemplary embodiments, the network address "generated" by the network address generator 140 can be "generated" by the network address generator 140 by selecting the network address from a predefined list of such network addresses. In this case, the network address generator 140 must use one of the addresses of the predefined list that is not currently assigned to some other workflow document, task, event or the like.

Similarly, after the network address generator 140 selects one of the predefined addresses, that address cannot be used by the network address generator 140 for some other purpose until the selected network address is released, for example, by the recipient responding to the email in an appropriate manner. In this case, the network address is not random, but is rendered specific to this electronic message for the duration until this electronic message is properly responded to.

In various other exemplary embodiments, the network address can be generated by the network address generator 230 and/or 140 as needed as a pseudo-random alphanumeric string or as an alphanumeric string generated from at least some of the state information of the sender and/or the workflow document, event, task or the like that forms the subject of the electronic message. In this case, the network address may or may not be random. Even if it is not random, as generated, it is specific to this electronic message. Thus, if the network address generator 230 and/or 140 happens to attempt to generate the same address for a different electronic message, the network address generator 230 and/or 140 would recognize this and generate a different specific network address for that different electronic message.

It should be appreciated that one reason that random or psuedo-random generated network addresses, or any arbitrarily assigned or derived network address, are used is to improve the security of the systems and methods according to this invention. The network address supplied by the user to the recipient gives the recipient at least limited access to the workflow system. However, as outlined above, the recipient is often located outside of the workflow system. Thus, it is possible that a third party could attempt to access the workflow system by guessing the generated network address, or by trying all potential workflow addresses.

The random or psuedo-random generated network addresses, or any arbitrarily assigned or derived network address, adds a level of security, by making it harder to guess the network address, or even brute-force try all potential network addresses. With a sufficiently-complex network address, it is unlikely that someone else can simply guess the number and achieve access to the workflow system. Thus, the random or psuedo-random generated network addresses, or any arbitrarily assigned or derived network address, act to prevent easy access by interlopers. It should thus be appreciated that security here comes from the fact that if someone were to try to guess random or psuedo-random generated network addresses, or any arbitrarily assigned or derived network address, by simply trying all of them, it would take a lot of attempts, and thus a lot of time. Additionally, the workflow system, or the system administrator, is likely to notice if the workflow system gets a large number of refused requests to access something.

It should be appreciated that, in the systems and methods of this invention, the workflow system encodes a lot of understanding into the unique and/or random network address, whether the network address is an arbitrarily derived alphanumeric string or a predefined list similarly arbitrarily derived, that provides a recipient with access to a document, or the like, on the workflow system. This understanding includes what document is to be accessed, what state that document should be in, what state should that document be allowed to advance to, who should be able to access that document in that state, and the like. It should be appreciated that techniques for generating the unique and/or random network address, whether the network address is an arbitrarily derived alphanumeric string or a predefined list similarly arbitrarily derived, would be apparent to those skilled in the art. Thus, any appropriate known or later-developed technique for generating the network address can be used when implementing the network address generator 230 and/or 140.

The workflow system interface 150 allows the sender device 100 to connect to the workflow system 200 and enables the user of the sender device 100 to interact with the workflow system 200 as needed and as it relates to the business process. For example, a user can use the sender device 100 to generate and send an electronic message to the recipient device 400. In doing so, the sender device 100 can route a copy of the electronic message to the workflow system 200 via the workflow system interface 150.

Similarly, the network interface 160 allows the sender device 100 to connect to the network 300 and enables information to be transmitted to and/or received from the recipient device 400 via the network 300.

As indicated above, it should be appreciated that, in various exemplary embodiments, the network address generator 140, rather than being implemented as part of the sender device 100, can instead be implemented as the network generator 230 of the workflow system 200. In this case, the sender device 100 could access the workflow system 200 via the workflow interface system 150 to obtain the network address to embed into the email communication to be sent to the recipient. It should be appreciated that the user can access the workflow system 200 using a URL or the like, using an email address, or any other appropriate protocol. In response, network address generator 230 of the workflow system 200 then creates or selects one or more different addresses. It should further be appreciated that, in various exemplary embodiments, the user or the sender device does not specify the addresses to be used. Rather, the addresses are determined in view of a schema selected by the user of the sender device. It should be appreciated that this selected schema can be any appropriate schema that is able to generate or select random or psuedo-random generated network addresses, or any arbitrarily assigned or derived network addresses.

A user uses the sender device 100 to send a message to a recipient so that the recipients are able to access a specific location within the workflow system 200 by generating an electronic message using the electronic mail application 130. In the body of the message, the user uses the network address generator 230 or 140 to assign a specific network address location within the workflow system 200. In the case of the Internet, this address location would be a specific URL address. This message can be sent to the recipient device 400 via the network interface 160. The message can be provided to the workflow system 200 via the workflow system interface 150. Further, upon generating the specific network address for the specific location within the workflow system 200, the workflow system 200 may be updated to know which recipient is associated with the specific network address.

In one exemplary embodiment of the systems and methods according to this invention, a recipient, who does not have access to the workflow system may, upon opening an electronic mail message transmitted from a user of the workflow system 200, find a network address embedded in the message. Depending on the action requested of the recipient, the recipient may be required to activate the network address directly from the email message. The network activation would be received through the network interface 218 of the workflow system 200. The controller 210 of the workflow system 200 may require an identification of the recipient, such as, for example, an email address, before the recipient is permitted access to the workflow system 200 via the network interface 218. According to various exemplary embodiments of the systems and methods according to this invention, the recipient may achieve access to a specific area of the workflow system 200 that requires the recipient's attention. For example, a document requiring the recipient's approval/disapproval may be accessed.

Figure 4:
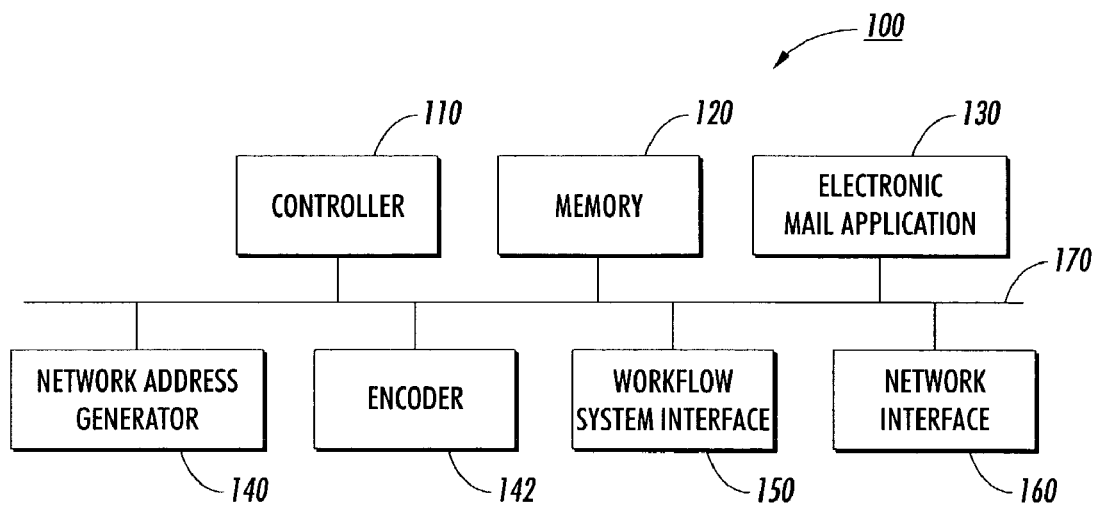
FIG. 4 is a block diagram of a second exemplary embodiment of the sender device of FIG. 1 according to this invention.

FIG. 4 is a block diagram of a second exemplary embodiment of the sender device 100. As shown in FIG. 4, in this second exemplary embodiment, the sender device 100 again includes one or more of the controller 110, the memory 120, the electronic mail application 130, the workflow system interface 150, and the network interface 160. In this second exemplary embodiment, the sender device 100 also includes an encoder 142. All of these elements 110-160 may be connected together by the common bus 170. Similarly, it should be appreciated that the encoder 140 could instead be included in the workflow system 200.

The encoder 142 can include any software program that works in conjunction with the electronic mail application 130 to encode unique or specific electronic mail addresses in the "Reply-to" portion of the header of the email message, such that the encoded electronic mail address is specific to the recipient of the electronic mail message. The recipient of the electronic mail message can click on the "Reply-to" line of the message to automatically provide a reply to the workflow system 200, and, optionally, to the sender of the electronic mail message. This enables the workflow system 200 to incorporate replies sent using this "Reply-to" address and any associated actions into the relevant workflow process.

It should be appreciated that the electronic mail address encoded into the "Reply-to" line can be a fixed or predetermined electronic mail address. Alternatively, the electronic mail address encoded by the encoder 142 can be generated the network address generator 230 or 140, using any of the techniques disclosed above, as well as any other appropriately known or later developed techniques. In this case, in this second exemplary embodiment, the workflow system 200 or the sender device 100 will include both of the encoder 142 and the network address generator 230 or 140.

It should be appreciated that the second embodiment of this invention may be used to advance the state of the workflow process by encoding email addresses in the body of the email message. For example, a message sent to a recipient requesting acceptance or rejection of a workflow document may have a number of encoded email address, one each for acceptance and rejection. By clicking on the appropriate response, an email message is sent to the workflow system, which adjusts the workflow state accordingly. Further, in various exemplary embodiments, the system may additionally provide the email address of the sender in the "Reply-to" portion of the email header generated by the encoder 142. This may ensure that the sender also receives a copy of the recipient's response. In other various exemplary embodiments, the workflow system 200 may provide a notification to the sender upon receipt of the recipient's response.

It should be further appreciated that the use of encoded electronic mail addresses share the same property of the specific network addresses generated by the network address generator 230 or 140 used to provide specific and targeted access to the workflow system 200. These properties may include, but are not limited to, information about documents and the state of the workflow system, the sender, and/or the recipient and the like. Again, the exemplary embodiments of the systems and methods of this invention advance any statebased workflow process, not just documentation acceptance or rejection.

Figure 5:
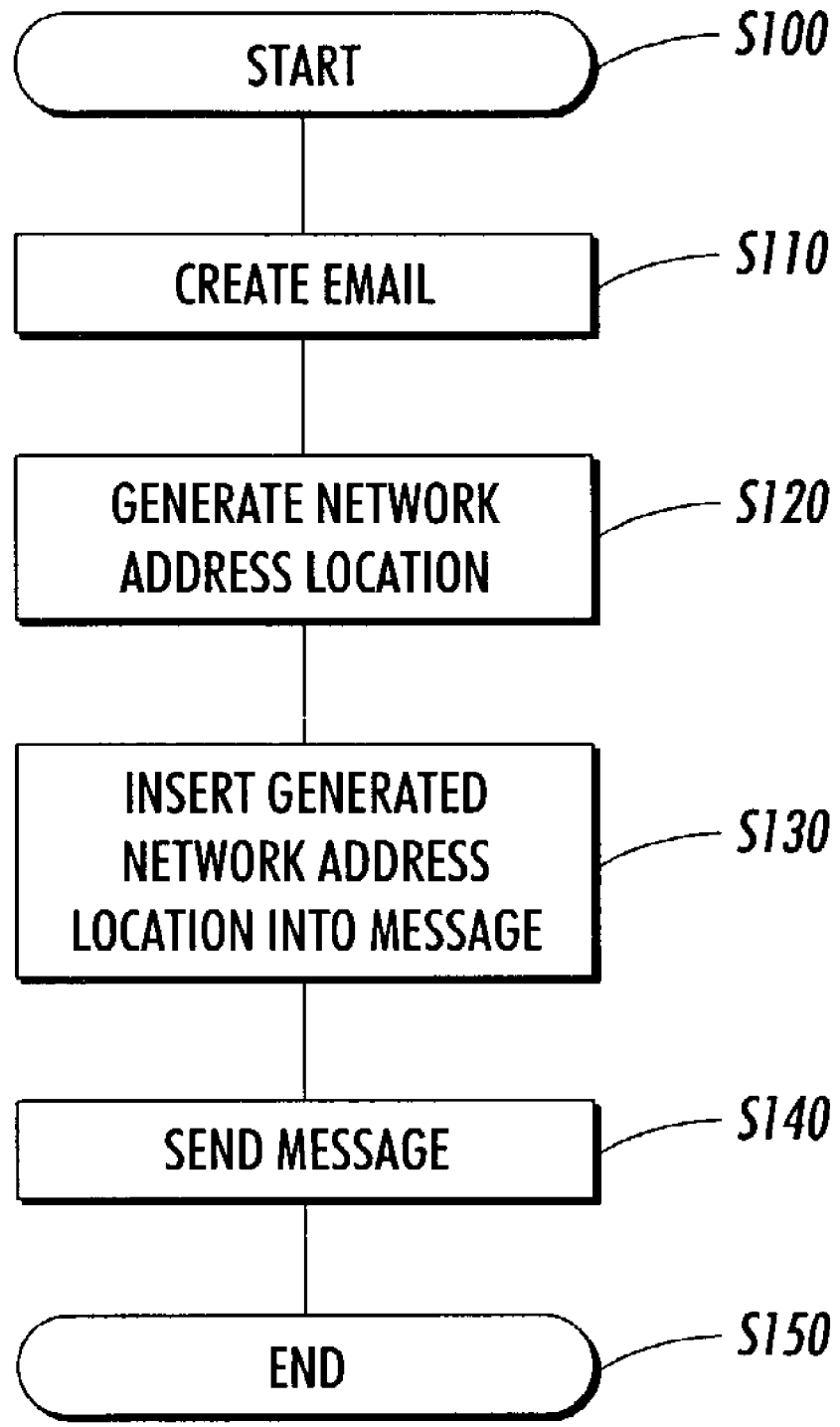
FIG. 5 is a flowchart outlining a first exemplary embodiment of a method for sending a workflow-enabled electronic message according to this invention.

FIG. 5 is a flowchart outlining a first exemplary embodiment of a method for transmitting workflow-enabled electronic mail message from a user of the workflow system to a recipient according to this invention. Beginning in step S100, operation continues to step S110, where the user of the workflow system creates an electronic mail message. Then in step S120, a network address location, such as, for example, a URL, that is specific to this email message is generated. Next, in step S130, the generated network address location is inserted into the body of the electronic mail message to be sent to the recipient. Then, in step S140, the message is sent to the recipient. Operation then continues to step S150, where operation of the method ends.

It should be appreciated that, in various exemplary embodiments, in step S120, the network address location is generated and/or selected at a sender device used by the user of the workflow system. In this case, in step S130, the generated/selected network address is inserted by the user and/or the sender device. Then in step S140, the user and/or the sender device sends the message to the recipient. Alternatively, in various other exemplary embodiments, in step S120, the network address location is generated after the message is sent by the user, but before the message is actually transmitted to the recipient. In this case, the message is first diverted to the workflow system. When the message arrives at the workflow system to which it has been diverted, the network address is generated and/or selected. Thus, in step S130, the generated/selected network address is inserted by the workflow system into the message. Then, in step S140, the message is finally sent to the recipient by the workflow system.

Accordingly, in one exemplary embodiment of the first alternative outlined above, the user opens up the user's mail program, and opens an email message. The user then opens the workflow system. Next, the user has the workflow system generate and/or select a network address. The user or the sender device then inserts that network address. For example, the user could copies that network address, then paste that network address into the email message, and then proceeds. In contrast, in one exemplary embodiment of the second alternative outlined above, a more automatic operation is obtained. This is discussed in greater detail below with respect to FIG. 15 and in the discussion about interception of messages by the workflow system and the automatic inclusion of "magic" addresses.

Figure 6:
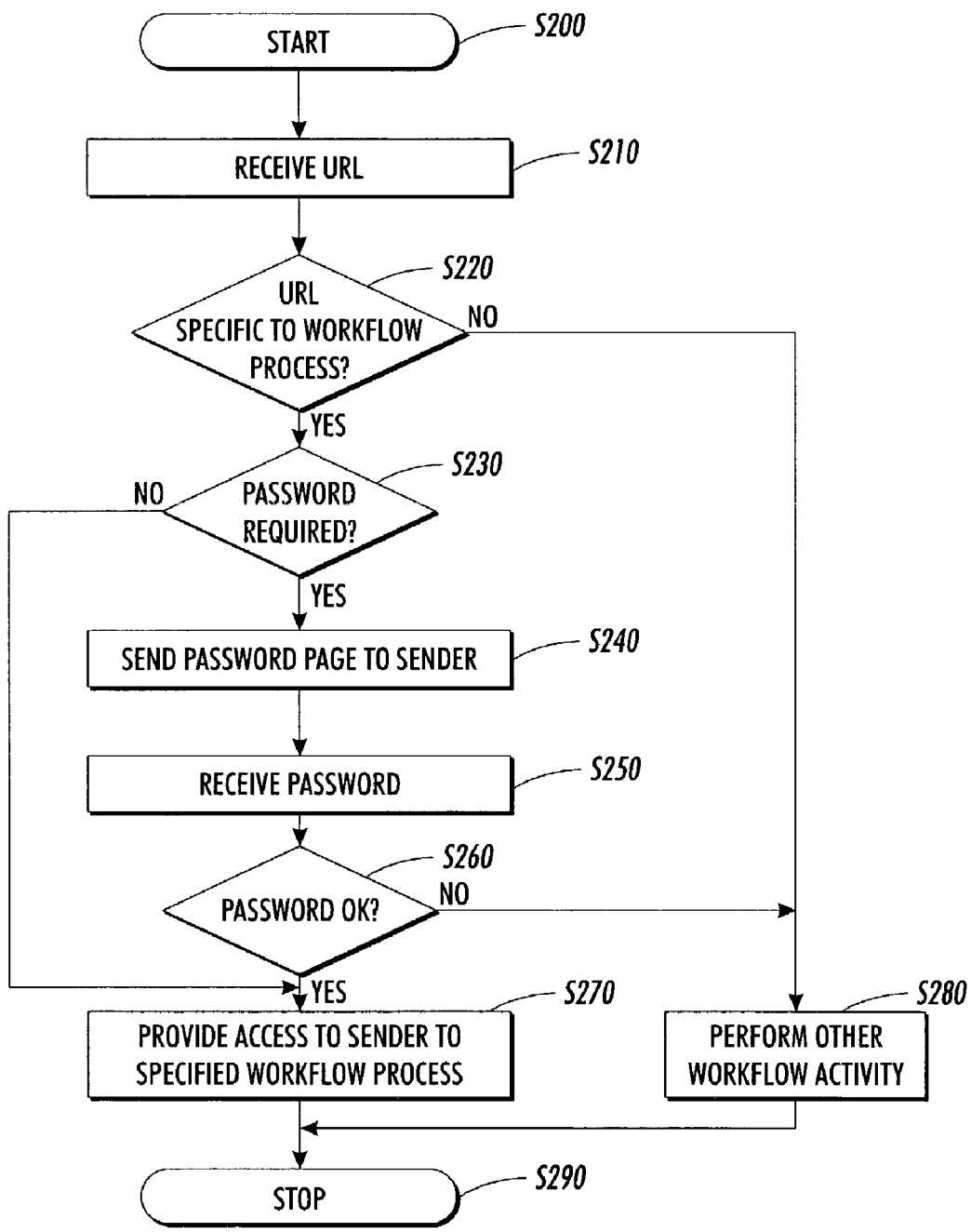
FIG. 6 is a flowchart outlining a first exemplary embodiment of a method for responding to a workflow-enabled email message according to this invention.

FIG. 6 is a flowchart outlining a first exemplary embodiment of a method for a workflow system responding to a workflow-enabled email message according to this invention. Beginning in step S200, operation continues to step S210, where the workflow system receives an URL from a recipient of a workflow-enabled message. Then, in step S220, the workflow system determines whether the received URL from the recipient is specific to a workflow process. If the URL is specific to a workflow process, operation continues to step S230. Otherwise, operation jumps to step S280.

In step S230, the workflow system determines if a password is required from the recipient who sent the URL to the workflow system for the workflow system to allow the recipient to access the web page specified by this URL. If a password is required, operation continues to step S240. Otherwise, operation jumps to step S270. Then, in step S240, a password page is sent to the sender of the URL. Next, in step S250, the workflow system receives a password from the sender. Operation then continues to step S260.

In step S260, the workflow system determines whether the password is valid. If the password is valid, operation continues to step S270. Otherwise, operation jumps to step S280. In step S270, access to the specified workflow process is provided to the sender. Operation then jumps to step S290. In contrast, in step S280, another workflow activity may be performed, for example, logging in the attempted access of the workflow system by the sender. Operation then continues to step S290, where the operation of the method ends.

Figure 7:
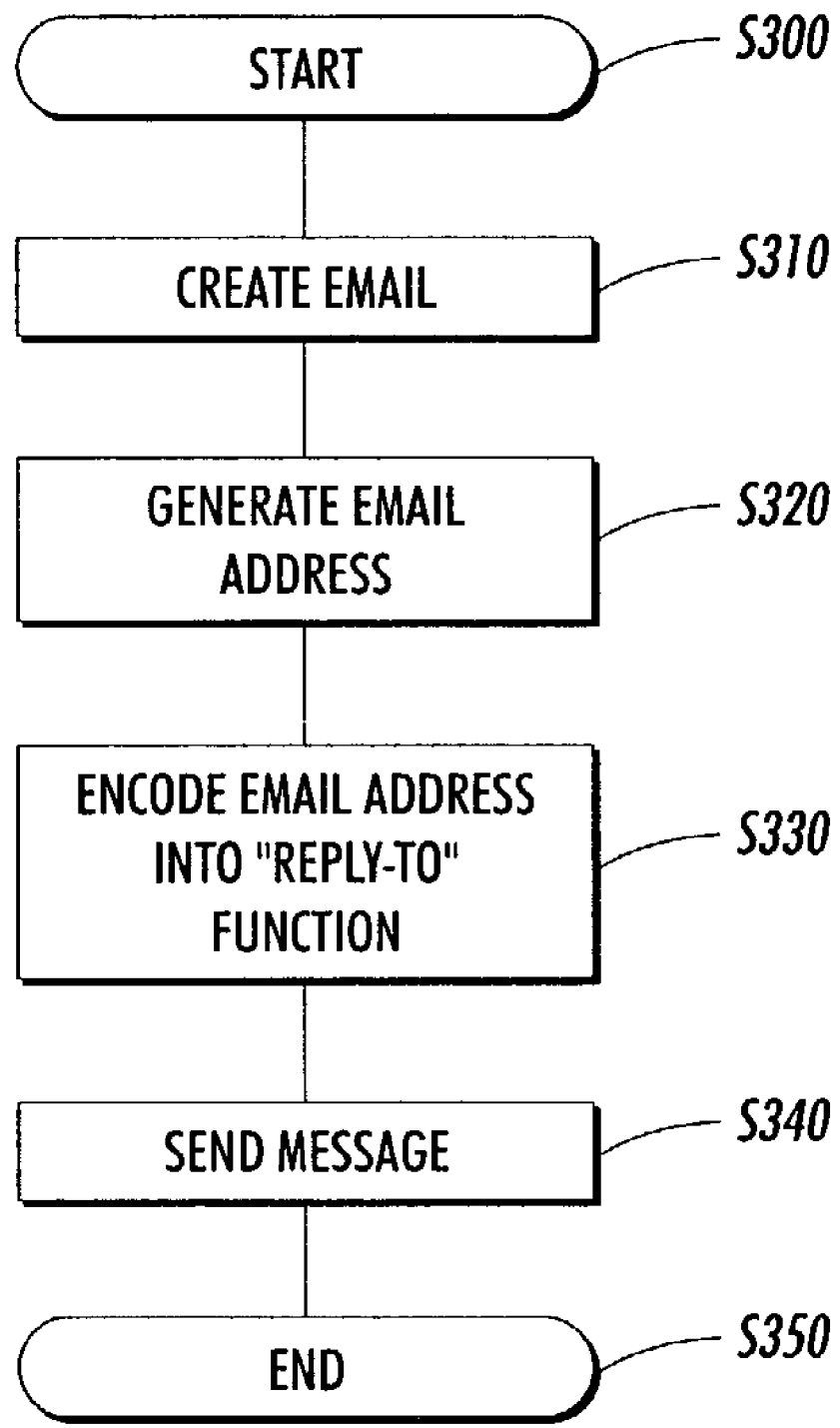
FIG. 7 is a flowchart outlining a second exemplary embodiment of a method for sending a workflow-enabled electronic message according to this invention.

FIG. 7 is a flowchart outlining a second exemplary embodiment of the method for transmitting a workflow-enabled electronic mail message from a user of the workflow system to the recipient according to this invention. Beginning in step S300, operation continues to step S310, where the user of the workflow system creates an electronic message. Then, in step S320, an email address for the recipient to use when replying to the message that is specific to this email message is generated. Next in step S330, the generated e-mail address is encoded into a "Reply-to" portion of the header of the electronic mail message. Then, in step S340, the message is sent to the recipient. Operation then continues to step S350, where operation of the method ends. Again, it should be appreciated that, similarly to steps S120-140, steps S320-340 could occur either within the sender device being used by the user, or within the workflow system after the message is diverted.

Figure 8:
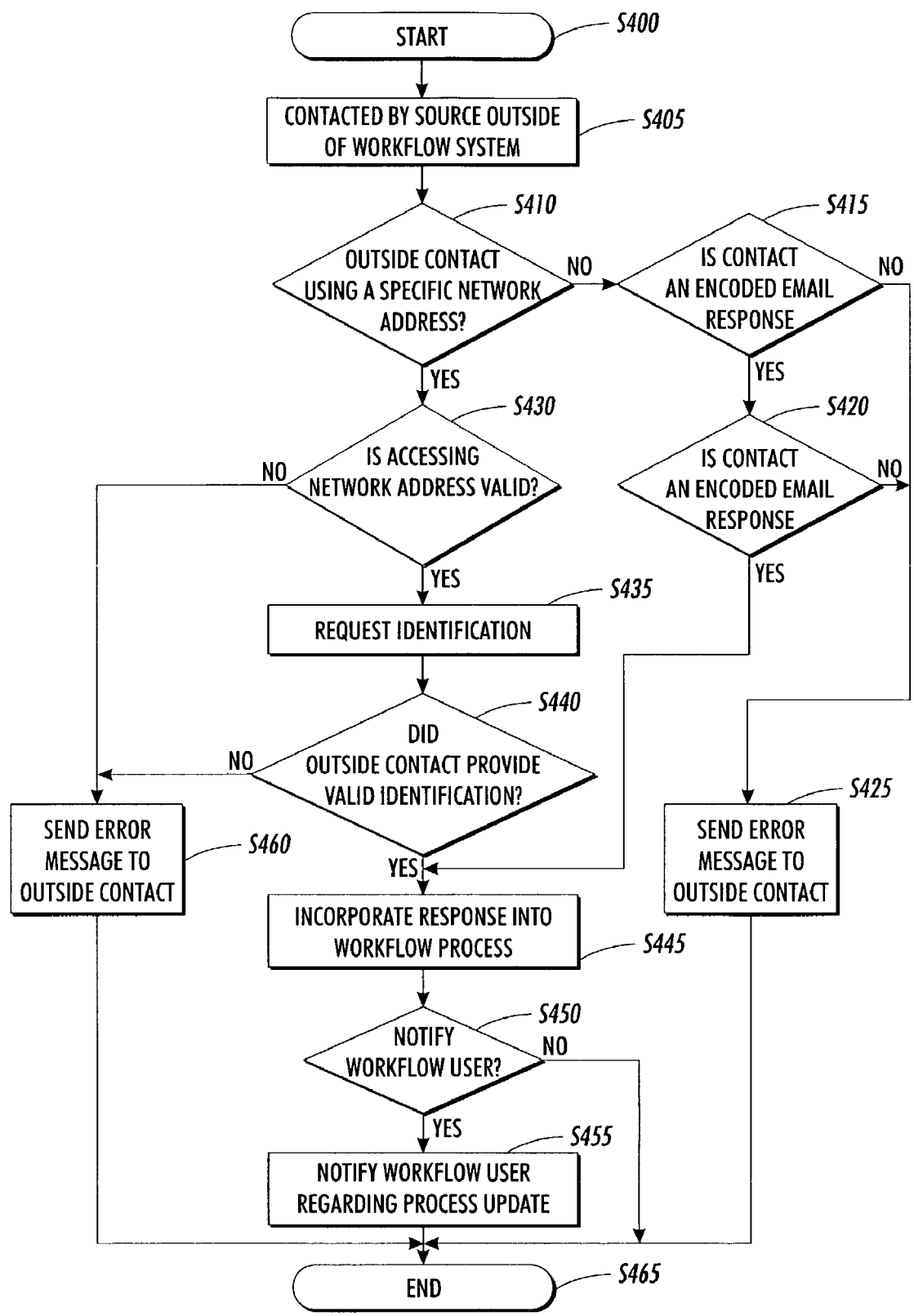
FIG. 8 is a flowchart outlining a second exemplary embodiment of a method for responding to a workflow-enabled e-mail message according to this invention.

FIG. 8 is a flowchart outlining a method responding to a response received from a recipient responding to a workflow-enabled email message according to this invention. Beginning in step S400, operation continues to step S405, where the workflow system is contacted by an outside source. Then, in step S410, a determination is made if the contact is made using a specific network address for accessing the workflow system. If the outside contact is made using such a specific network address, operation continues to step S415. Otherwise, operation jumps to step S430.

In step S415, a determination is made whether the outside contact is an encoded email response. If the outside contact is an encoded email response, operation continues to step S420. Otherwise, operation jumps to step S425. In step S420, a determination is made whether the encoded email address is valid. If the encoded email address is valid, operation jumps to step S445. Otherwise, operation continues to step S425. In step S425, an error message is sent to the outside contact. Operation then jumps to step S465.

In step S430, a determination is made whether the network address is valid. If the address is valid, operation continues to step S435. Otherwise, operation jumps to step S460. In step S435, a request is sent to the outside contact to provide appropriate identification. Next, in step S440, a determination is made whether the identification received in response is valid. If the identification is valid, operation continues to step S445. Otherwise, operation again jumps to step S460.

In step S445, the response provided by the outside contact is incorporated into the workflow process. Then, in step S450, a determination is made whether a workflow user, such as, for example, the sender of the workflow-enabled message that is being responded to, should be notified. If the workflow user is to be notified, operation continues to step S455. Otherwise, operation jumps directly to step S465. In step S455, the workflow user is notified.

In step S460, an error message is sent to the outside contact. The error message can be specific to the error that occurred in either step S430 or step S440, or can merely be a generic error message. Operation then continues to step S465, where operation of the method ends.

Figure 9:
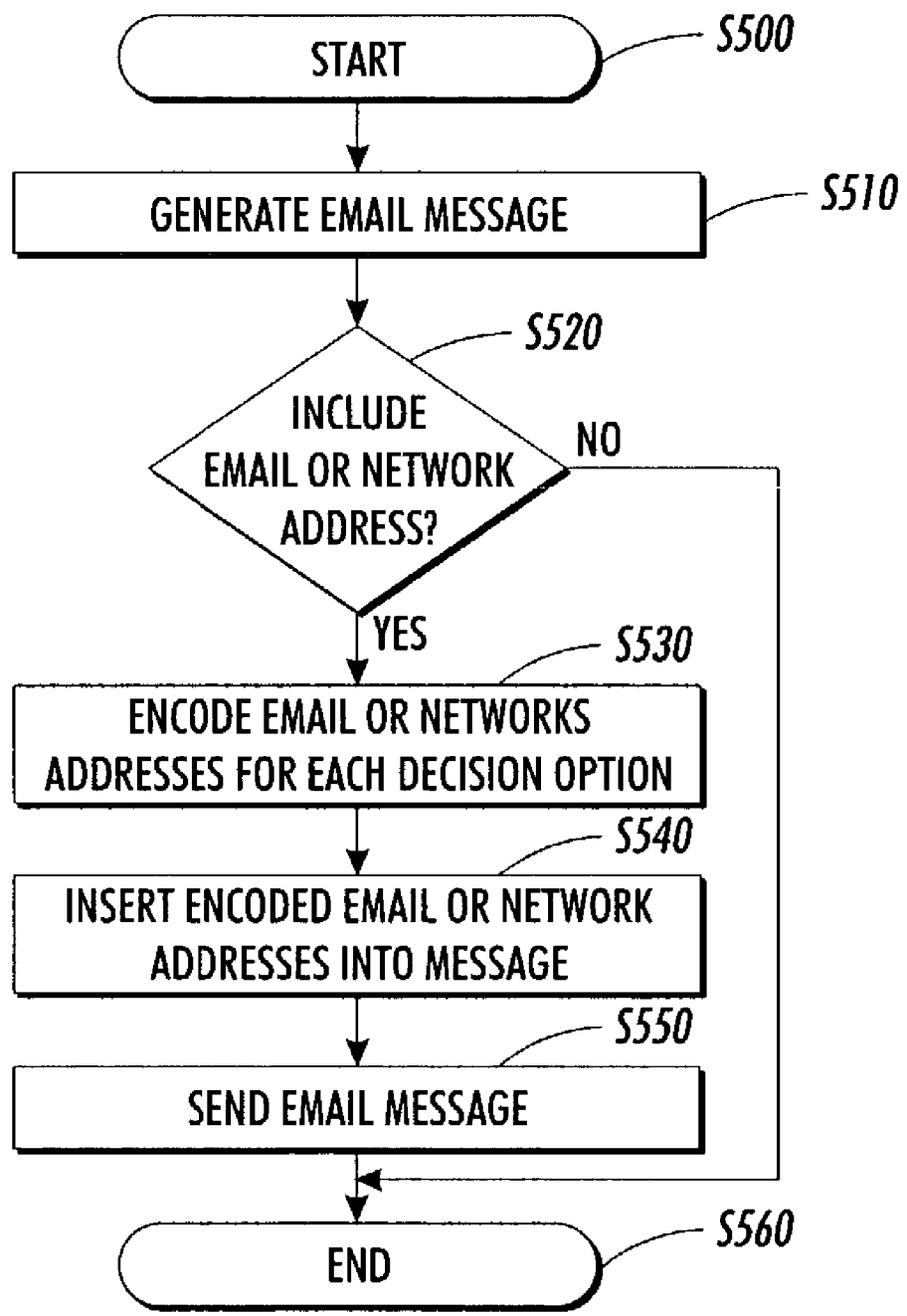
FIG. 9 is a flowchart outlining a third exemplary embodiment of the method for sending a workflow-enabled electronic message according to this invention.

FIG. 9 is a flowchart outlining a third exemplary embodiment of a method for sending a workflow-enabled electronic message. Beginning in step S500, operation goes to step S510, where the sender generates an email message. Then, in step S520, a determination is made whether to include a number of different email addresses or network addresses in the email message. In this case, different email or network addresses can be associated with different types of responses appropriate for the workflow process that is the subject of the email message. For example, the different addresses can be associated with different assessments of a workflow process, such as, for example, acceptance or rejection of a document. If a number of response addresses are to be included, operation continues to step S530. Otherwise, operation jumps to step S560.

In step S530, the different email or network addresses are assigned to the different response options. Then, in step S540, the encoded email addresses are inserted into the email message. Next, in step S550, the message is sent. Operation then continues to step S560, where operation of the method ends.

Figure 10:
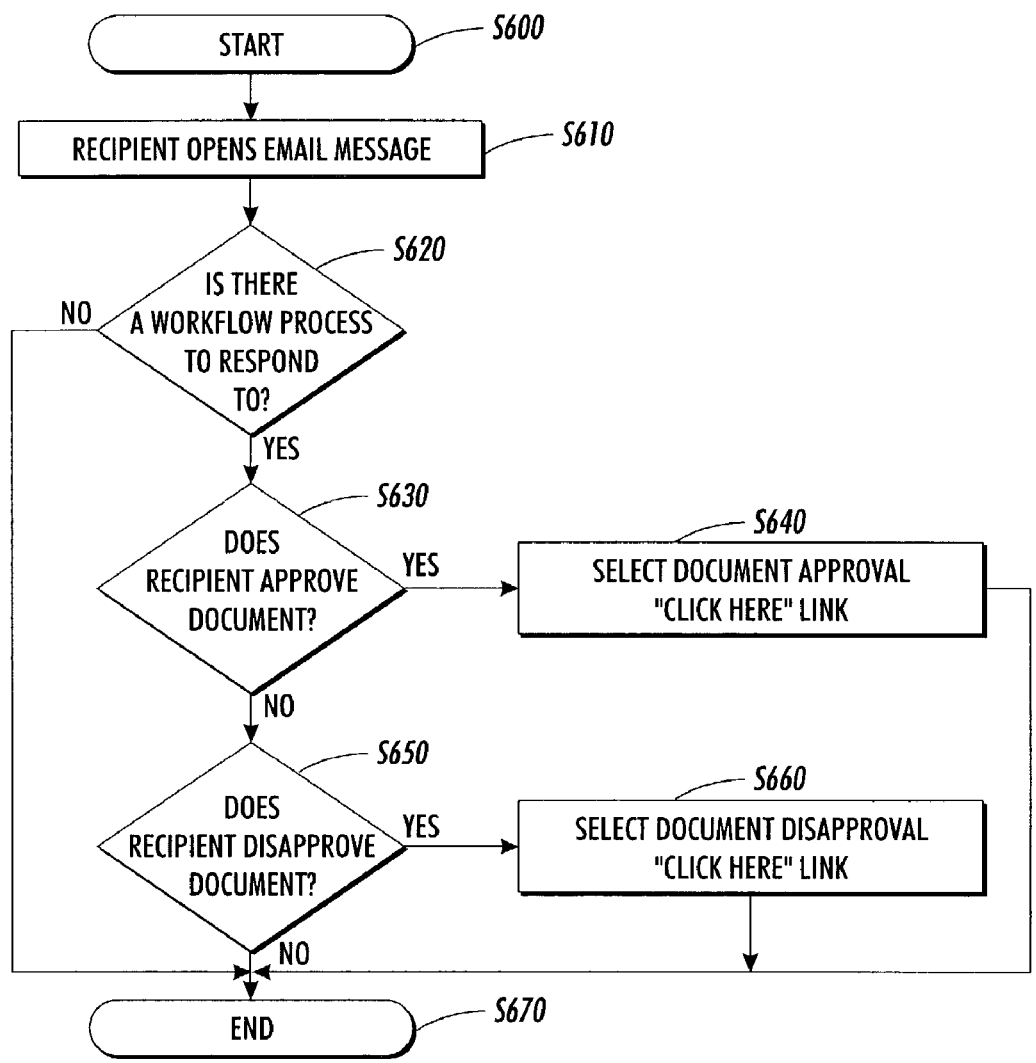
FIG. 10 is a flowchart outlining a third exemplary embodiment of a method for responding to a workflow-enabled electronic message according to this invention.

FIG. 10 is a flowchart outlining one exemplary embodiment of a method for responding to an email message that contains a number of different email addresses or network addresses in the email message. In particular, in FIG. 10, the workflow process that is associated with the sent email message is approval or disapproval of a document. It should be appreciated that this workflow process is illustrative only. Thus, the method outlined in FIG. 10 will be modified based on the workflow process and the number of different potential responses the sender and/or the workflow system wants to give to the recipient when responding to the sent email message.

Beginning in step S600, operation continues to step S610, where the recipient opens the workflow enabled email message from the sender. Then, in step S620, a determination is made whether there is a workflow process to respond to. If so, operation continues to step S630. Otherwise, operation jumps to step S670.

In step S630, a determination is made by the recipient whether the recipient approves the document. If so, operation continues to step S640. Otherwise, operation jumps to step S650. In step S640, the recipient selects the link or reply-to address that is associated with approving the document. Operation then jumps to step S670. In contrast, in step S650, a determination is made by the recipient whether the recipient disapproves the document. If so, operation continues to step S660. Otherwise, operation jumps to step S670. In step S660, the recipient selects the link or reply-to address that is associated with disapproving the document. Operation then continues to step S670. Thus, if the recipient does not want to, or cannot, make the approval/disapproval decision at this time, operation skips both step S650 and step S660. In step S670, operation of this method ends.

Figure 11:
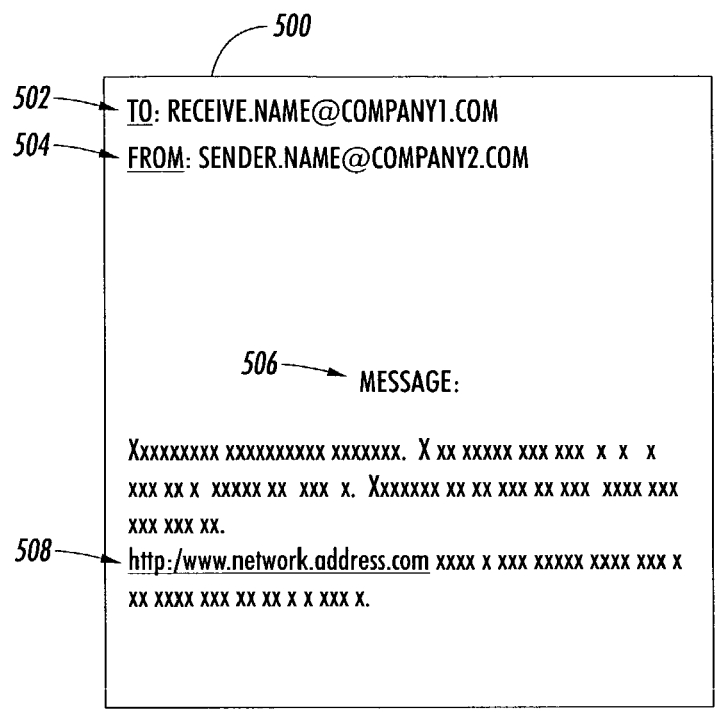
FIG. 11 is first exemplary embodiment of an email message according to this invention.

FIG. 11 illustrates a first exemplary embodiment of an electronic message generated according to the systems and methods of this invention. As shown in FIG. 11, the electronic message 500 includes a "To" line 502, a "From" line 504, a message 506, and a generated network address 508 that is specific to this electronic message. Although the "To" line 502 and the "From" line 504 are shown using address nomenclature commonly associated with the Internet, it should be understood that any network could be used and the compatible address nomenclature could be used for the "To" line 502 and the "From" line 504. Further, the format of the electronic message may differ depending upon the electronic messaging software used to generate the message, even though the various software elements may use the same network medium, such as the Internet.

As shown in FIG. 11, the "To" line 502 identifies the recipient of the electronic mail message and the "From" line 504 identifies the sender, or, in this case, the user of the workflow system, who generated this electronic mail message. Although depicted using common Internet email address nomenclature to identify the recipient and the sender of the message, it should be understood that other ways of identifying the recipient and the sender may be used as is well known to one of ordinary skill in the art.

In the message 506, as shown in FIG. 11, the generated specific network address 508 is inserted into the body of the message 506. The generated specific network address 508 identifies a specific location within the workflow system and enables access to that specific location by the recipient or by anyone else who can provide that specific network address. For example, the sender of the message 500, who may be a user of the workflow system, may wish to have the recipient of the message 500 access a document within the workflow system for review and approval.

Upon receiving the electronic mail message 500, the recipient may click on the generated specific network address 508 or otherwise provide that network address to an appropriate network browser or the like. In response, the recipient will be able to access that specific portion, which is, in this case, a document, within the workflow system. Thus, several different specific network addresses 508 that access the same location within the workflow system can be generated for multiple recipients. In that case, each recipient will be provided with a user-specific relatively-unique generated network address 508. The workflow system can then determine the identity of the particular recipient who has replied to a specific email message, by the unique network address used by the recipient to access the specific location within the workflow system.

Figure 12:
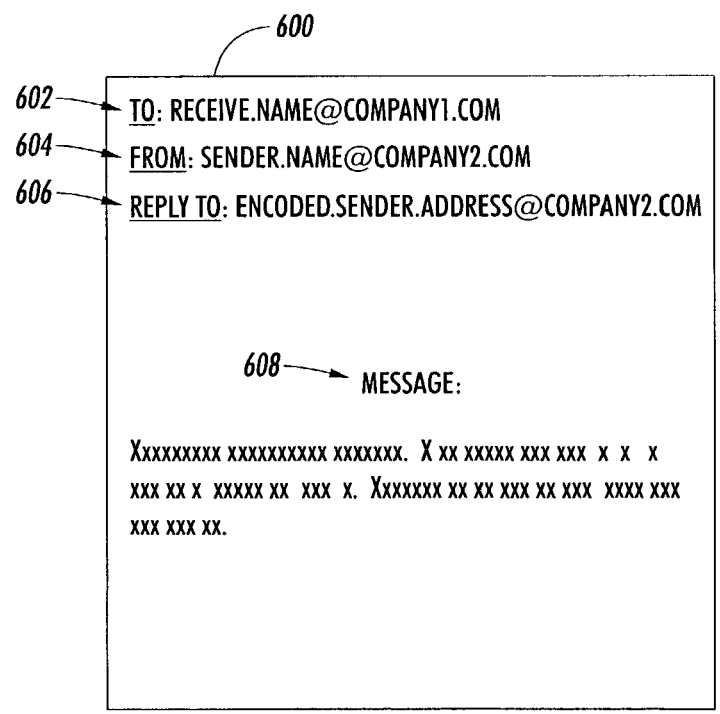
FIG. 12 is second exemplary embodiment of an email message according to this invention.

FIG. 12 illustrates second exemplary embodiment of an electronic mail message 600 generated according to the systems and methods according to this invention. As shown in FIG. 12, the electronic mail message 600 includes a "To" line 602, a "From" line 604, a "Reply-to" line 606 and a message 608.

As shown in FIG. 12, the "To" line 602 and the "From" line 604 are similar to FIG. 11 and are depicted in an Internet protocol using a standard Internet email address format. As above, it should be understood that the address nomenclature may vary depending upon the network being used, as well as the type of software employed by the sender of the electronic mail message.

As is well-known in the art, the header portion of an email message commonly identifies the address to which a reply to that email message is to be directed. Usually, this reply-to address is the address of the sender. However, in various exemplary embodiments of the systems and methods according to this invention, the reply-to address in the header instead identifies one or more random or psuedo-random generated network addresses, and/or one or more arbitrarily assigned or derived network addresses. Thus, when the recipient selects the "reply to" function of the recipient's email reader, in the resulting email message, the "Reply-to" line 606 contains an encoded electronic mail address that directs the reply message of the recipient to this encoded address. Based on the information contained in the "Reply-to" line 606, the recipient's return message will be directed to the electronic mail address encoded in the "Reply-to" line 606. It should be understood that various methods and techniques can be used encode or otherwise embed the information to be used in the "Reply-to" line 606 into the email message to the recipient.

In the exemplary embodiment of the electronic message 600 shown in FIG. 12, the encoded electronic address and the "Reply-to" line 606 are specific to this electronic message 600. As a result, the workflow system can track the recipient's reply. For example, the recipient of the message depicted in FIG. 12 can reply to the content of the message by clicking on the "Reply-to" line 606. This will allow the sender to be notified that the message has been accessed and reviewed by the recipient. Further, the action of the recipient may be included as part of the workflow process, by routing the reply from the recipient directly to the workflow system. This may be accomplished by providing, in the "Reply-to" line 606, an encoded address that notifies the workflow system 200 that the part of the workflow process defined in the message 608, for example, the state of the workflow, has been addressed by the recipient.

Figure 13:
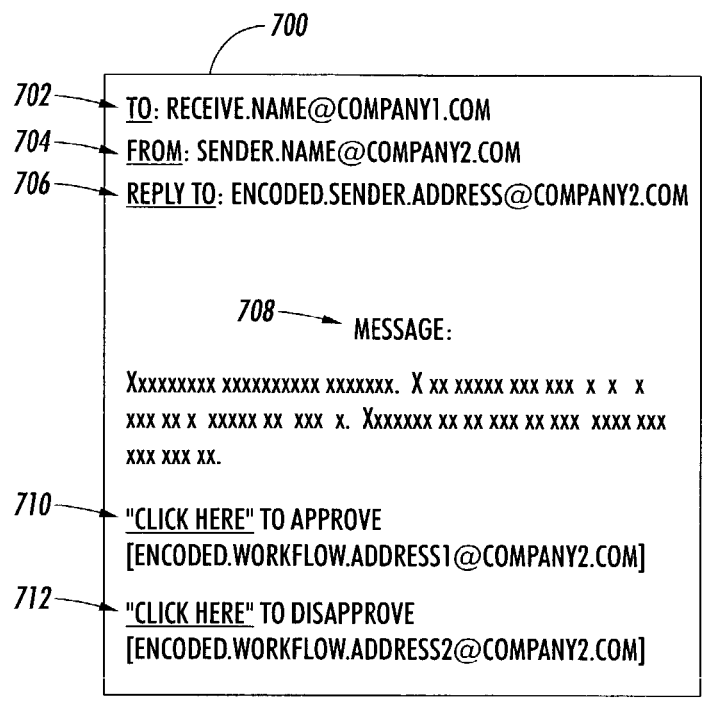
FIG. 13 is a third exemplary embodiment of an email message according to this invention.

FIG. 13 illustrates a third exemplary embodiment of an email message according to the systems and methods of this invention. As shown in FIG. 13, the electronic mail message 700 includes a "To" line 702, a "From" line 704, possibly a "Reply-to" line 706, a message 708, and a number of encoded email response lines 710 and 712.

As shown in FIG. 13, the "To" line 602 and the "From" line 604 are similar to FIG. 12 and are depicted in an Internet protocol using standard Internet email address format. As above, it should be understood that the address nomenclature may vary depending upon the network being used, as well as the type of software employed by the sender of the electronic mail message. Similar to FIG. 12, the "Reply-to" line 706 reflects the encoded electronic mail address that directs a copy of the reply message from the recipient to this encoded address that is contained, for example, in the header of the email message to the recipient. By accessing the "Reply-to" line, the recipient's return message will be directed to the electronic mail address encoded in the "Reply-to" line 706.

Additionally, as shown in FIG. 13, the email message 700 includes encoded email addresses 710 and 712 in the body of the email message 700. By selecting one of the "Click here" responses for the desired response, the recipient can transmit the recipient's response to the workflow system 200 and/or to the sender. The encoded email addresses embedded in the response lines 710 and 712 provides the workflow system and/or sender with the information necessary to alter the state of the workflow process associated with the address embedded in that response line 710 and 712.

Figure 14:
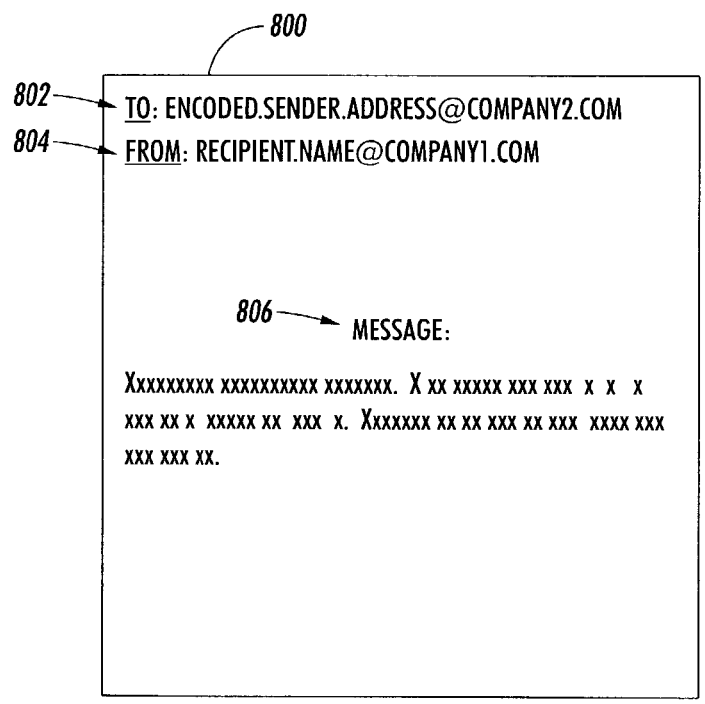
FIG. 14 is an exemplary embodiment of a reply to the email messages shown in FIGS. 12 and 13.

FIG. 14 is an exemplary embodiment of a reply to the email messages shown in FIGS. 12 and 13. As shown in FIG. 14, the electronic mail message 800 includes a "To" line 802, a "From" line 804, and a message 806.

As shown in FIG. 14, the "To" line 802 and the "From" line 804 are similar to FIGS. 12 and 13 in that these are depicted in an Internet protocol using standard Internet email address format. As above, it should be understood that the address nomenclature may vary depending upon the network being used, as well as the type of software employed by the sender of the electronic mail message.

Unlike FIGS. 12 and 13, the "To" line 802 contains the encoded electronic mail address that was in the "Reply-to" lines 606 and 706. Upon clicking the "Reply-to" line 606 or 706, the encoded email address of the sender is stored in the "To" line 802. The recipient's return message will be directed to the electronic mail address now encoded in the "To" line 802.

Figure 15:
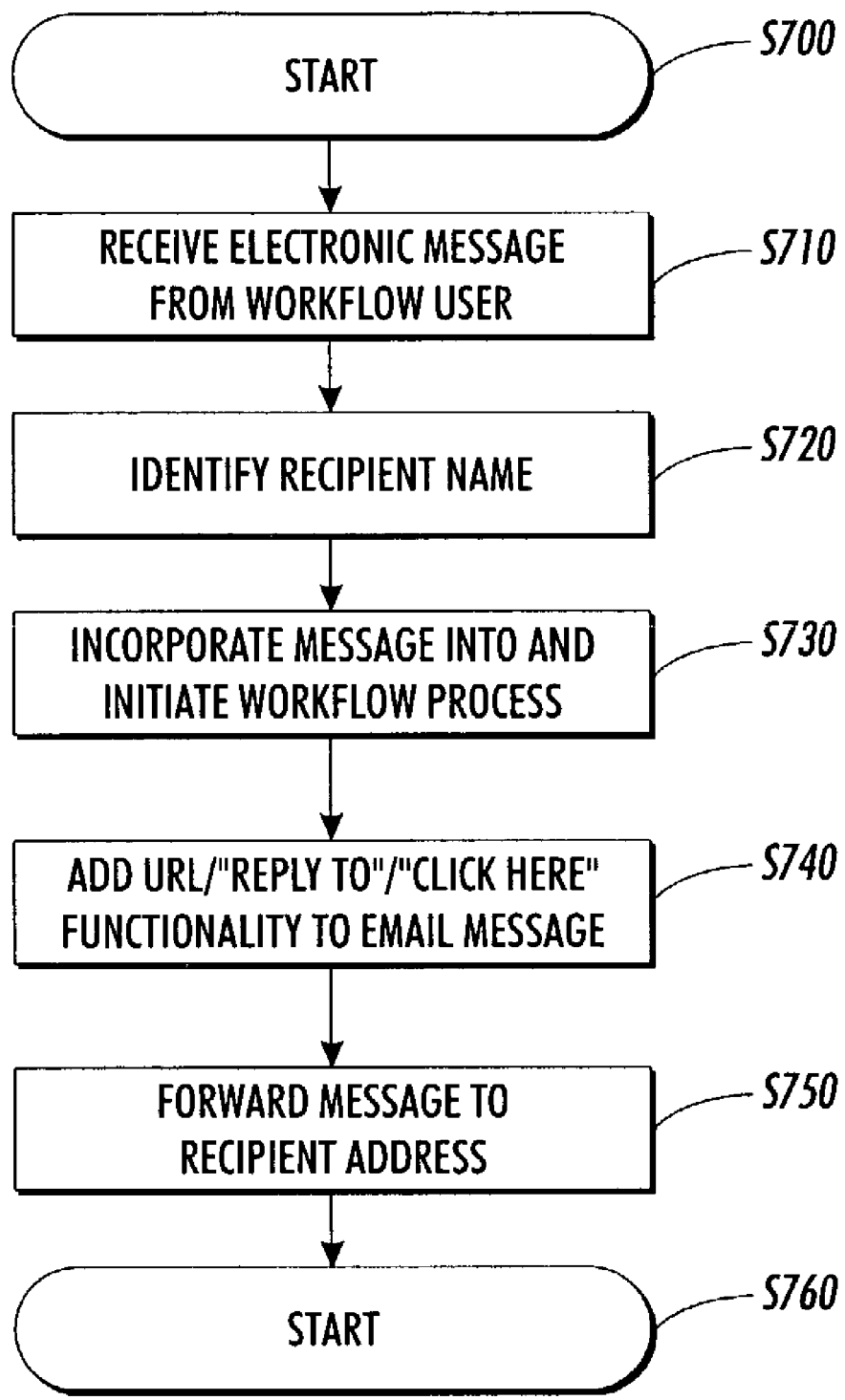
FIG. 15 is a flowchart outlining one exemplary embodiment of a method for using the workflow system to forward a workflow-enabled electronic message.

FIG. 15 is a flowchart outlining one exemplary embodiment of a method for using the workflow system to forward a workflow enabled electronic message from a sender to a recipient. Beginning in S700, operation continues to step S710, where an electronic message from a workflow user, that is, the sender, is received by the workflow system. Then in step S720, the name of the recipient of the electronic message is identified. Next, in step S730, the message is incorporated into the workflow process and the appropriate process is initiated based on this email message. Operation then continues to step S740.

In step S740, some type of reply functionality may be added to the email message forwarded from the sender. It should be appreciated that this reply functionality can be implemented using any of the various exemplary embodiments described above and shown in FIGS. 11-13. Next in step S750, the message, with the reply functionality, is forwarded to the recipient at the identified address. Operation then continues to step S360 where operation of the methods ends.

While this invention has been described in conjunction with various exemplary embodiments, it is to be understood that many alternatives, modifications and variations would be apparent to those skilled in the art. Accordingly, Applicants intend to embrace all such alternatives, modifications, and variations that follow in the spirit and scope of this invention, in particular, while the exemplary embodiments described above involved a system and method for advancing the state of a workflow process, it is to be understood that the system and methods of this invention may be used with any workflow process advancement.

The invention claimed is:

1. A method for transmitting a workflow-enabled electronic mail message from a user of a workflow system to a recipient, comprising:
   creating an email message to the recipient by the user, the recipient who does not have access to the workflow system;
   determining a network address;
   embedding a link to the determined network address in the email message to the recipient;
   associating a process of the workflow system with the determined network address; and
   sending the email message having the link to the determined network address to the recipient,
   wherein the link provides the recipient with an access to the associated process of the workflow system, the determining the network address comprises generating the network address, and the generating the network address comprises randomly or pseudo-randomly generating the network address.

2. The method of claim 1, further comprising associating the determined network address with the email message.

3. The method of claim 2, wherein associating the determined network address with the email message comprises associating an email address of the recipient to which the created email will be sent with the determined network address.

4. The method of claim 1, wherein:
   determining the network address comprises determining a plurality of different network addresses; and
   embedding a link to the determined network address into the email message to the recipient comprises embedding a plurality of links into the email message, each link being to one of the plurality of determined network addresses.

5. The method of claim 4, wherein associating a process of the workflow system with the determined network address comprises associating a different state of the associated process of the workflow system with each of the plurality of determined network addresses.

6. A method for transmitting a workflow-enabled electronic mail message from a user of a workflow system to a recipient, comprising:

creating an email message to the recipient by the user, the recipient who does not have access to the workflow system;
determining a network address;
embedding a link to the determined network address in the email message to the recipient;
associating a process of the workflow system with the determined network address; and
sending the email message having the link to the determined network address to the recipient,
wherein the link provides the recipient with an access to the associated process of the workflow system, the determining the network address comprises generating the network address, and the generating the network address comprises generating the network address based at least in part on information about at least one of at least the created email message, the recipient, the workflow process and the user.

7. A method for transmitting a workflow-enabled electronic mail message from a user of a workflow system to a recipient, comprising:
creating an email message to the recipient by the user, the recipient who does not have access to the workflow system;
determining an email response address;
incorporating the determined email response address into the email message to the recipient;
associating a process of the workflow system with the determined email response address; and
sending the email message having the incorporated email response address to the recipient, wherein the incorporated email response address provides the recipient with an access to the associated process of the workflow system,
wherein the determining the email response address comprises generating the email response address, and the generating the email response address comprises randomly or pseudo-randomly generating the email response address.

8. The method of claim 7, further comprising associating the determined email response address with the email message.

9. The method of claim 8, wherein associating the determined email response address with the email message comprises associating an email address of the recipient to which the created email will be sent with the determined email response address.

10. The method of claim 7, wherein incorporating the determined email response address into the email message to the recipient comprises incorporating the determined email response address into a reply-to portion of the email message.

11. The method of claim 7, wherein incorporating the determined email response address into the email message to the recipient comprises incorporating the determined email response address into a selectable element of the email message.

12. The method of claim 7, wherein:
determining the email response address further comprises determining a plurality of different email response addresses; and
incorporating the determined email response address into the email message to the recipient comprises incorporating the plurality of determined email response addresses into the email message.

13. The method of claim 12, wherein associating a process of the workflow system with the determined email response address comprises associating a different state of the associated process of the workflow system with each of the plurality of determined email response addresses.

14. A method for transmitting a workflow-enabled electronic mail message from a user of a workflow system to a recipient, comprising:
creating an email message to the recipient by the user, the recipient who does not have access to the workflow system;
determining an email response address;
incorporating the determined email response address into the email message to the recipient;
associating a process of the workflow system with the determined email response address; and
sending the email message having the incorporated email response address to the recipient, wherein the incorporated email response address provides the recipient with an access to the associated process of the workflow system,
wherein the determining the email response address comprises generating the email response address, and the generating the email response address comprises generating the email response address based on at least in part on information about at least one of at least the created email message, the recipient, the workflow process and the user.

15. A method for transmitting a workflow-enabled electronic mail message from a user of a workflow system to a recipient, comprising:
creating an email message to the recipient by the user, the recipient who does not have access to the workflow system;
determining a network address;
embedding a link to the determined network address in the email message to the recipient;
associating a process of the workflow system with the determined network address; and
sending the email message having the link to the determined network address to the recipient,
wherein the link provides the recipient with an access to the associated process of the workflow system, the determining the network address comprises generating the network address, and excluding generated network addresses that have previously been embedded in any previous e-mail messages created by the system that have not yet been accessed.

* * * * *